The United States Patent

Konz et al.

[11] 3,900,566
[45] Aug. 19, 1975

[54] PHARMACEUTICAL COMPOSITIONS CONTAINING THE TERT BUTYL ESTER OF N-[(1-CARBOXY-L-PROLYL)-OXY]-SUCCINIMIDE AND METHOD OF USE

[75] Inventors: Wilhelm Konz, Ingelheim am Rhein; Franz Waldeck, Mainz-Hechtsheim; Hans-Michael Jennewein, Wiesbaden, all of Germany

[73] Assignee: Boehringer Ingelheim GmbH, Ingelheim am Rhein, Germany

[22] Filed: Jan. 18, 1974

[21] Appl. No.: 434,674

Related U.S. Application Data

[63] Continuation of Ser. No. 330,182, Feb. 7, 1973, abandoned.

[30] Foreign Application Priority Data

Feb. 14, 1972  Germany............................ 2206867

[52] U.S. Cl. ............................................... 424/274
[51] Int. Cl. ............................................ A61k 27/00
[58] Field of Search .................................... 424/274

[56] References Cited
OTHER PUBLICATIONS
J.A.C.S., 86, 1839–1842 (1964).

*Primary Examiner*—Frederick E. Waddell
*Attorney, Agent, or Firm*—Hammond & Littell

[57] ABSTRACT

Pharmaceutical compositions containing as an active ingredient the tert.butyl ester of N-[(1-carboxy-L-prolyl)-oxy]-succinimide, and a method of inhibiting stomach juice secretion and combatting stomach ulcers therewith.

1 Claim, No Drawings

PHARMACEUTICAL COMPOSITIONS CONTAINING THE TERT BUTYL ESTER OF N-[(1-CARBOXY-L-PROLYL)-OXY]-SUCCINIMIDE AND METHOD OF USE

This is a continuation of copending application Ser. No. 330,182, filed Feb 7, 1973, now abandoned.

This invention relates to novel pharmaceutical compositions containing the tert.butyl ester of N-[(1-carboxy-L-prolyl)-oxy]-succinimide as an active ingredient, and to a novel method of inhibiting stomach juice secretion and combatting stomach ulcers therewith in warm-blooded animals.

BACKGROUND OF THE INVENTION

Gastrointestinal diseases, and particularly ulcerations of the stomach, have heretofore been therapeutically treated mainly with medications based on anticholinergics, that is, compounds of varying chemical structure which exert atropine-like effects upon the parasympathetic nervous system, principally suppression of spasms of the smooth musculature and reduction of gastrointestinal secretions. However, in addition to these desired pharmacological effects, such anticholinergics also produce undesirable side efffects usually associated with anticholinergics, such as mydriasis, dryness of the mouth and especially undesirable effects upon the heart and circulatory system.

OBJECTS OF THE INVENTION

It is an object of the present invention to provide pharmaceutical compositions for the treatment of gastrointestinal diseases and especially ulcerations of the stomach, which contain as an active ingredient a stomach juice secretion inhibiting and anti-ulcerogenic agent which is not of the anticholinergic type.

Another object of the present invention is to provide a method for effectively inhibiting gastric juice secretion and combatting ulceration of the stomach without concurrently producing the undesirable side effects of anticholinergics, such as mydriasis, dryness of the mouth and adverse effects upon the heart and circulatory system.

Other objects and advantages of the instant invention will become apparent as the description thereof proceeds.

THE INVENTION

The above objects are achieved in accordance with the present invention by using the tert.butyl ester of N-[(1-carboxy-L-prolyl)-oxy]-succinimide as the stomach juice secretion inhibiting and anti-ulcerogenic agent for the treatment of hypersecretion and ulceration of the stomach in warm-blooded animals, such as rats and dogs.

The tert.butyl ester of N-[(1-carboxy-L-propyl)-oxy]-succinimide of the formula

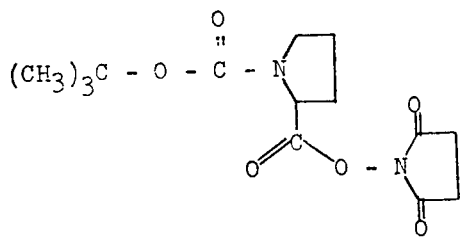

is a known compound which may be prepared, for example, by the method described in J.A.C.S. 86, 1839–1842 (1964). It is a non-anticholinergic acting stomach juice secretion inhibitor having an entirely new chemical structure compared to the active ingredients of this type of pharmacological indication heretofore used. It inhibits the unstimulated stomach juice secretion in rats after peroral as well as intraduodenal administration, which is an indication of complete and certain absorption of the compound.

Particularly remarkable is the surprisingly strong anti-gestrin action of the ester in dogs as well as in rats, in addition to its good inhibiting action upon the histamine-stimulated stomach juice secretion in dogs. In this respect the ester used pursuant to the instant invention surpasses atropine and exhibits practically the same activity strength as α-phenyl-α-pyridyl-thioacetamide which is described in the literature but is not commercially available. In comparison to the latter, the ester used in accordance with the present invention is only one-third as toxic, so that it has a significantly larger therapeutic ratio.

In contrast to atropine, the tert.butyl ester of N-[(1-caraboxy-L-prolyl)-oxy]-succinimide is free from the known undesirable anticholinergic side effects, such as mydriasis, dryness of the mouth and adverse effects upon the heart and circulatory system. Moreover, it exhibits excellent anti-ulcerogenic effects against artificially induced Shay- and stress-ulcers.

Therefore, the ester used in accordance with the present invention does not belong to the class of anticholinergics. Thus, since the instant invention provides a compound which is structurally completely new for ulcer therapy indication, it contributes to the enrichment of the knowledge of drugs inasmuch as it opens an entirely new chemotherapeutic way for the treatment of ulcers in warm-blooded animals.

For pharmaceutical purposes the tert.butyl ester of N-[(1-carboxy-L-prolyl)-oxy]-succinimide is administered to warm-blooded animals perorally or parenterally as an active ingredient in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. The daily oral dose rate of tert.butyl ester of N-[(1-carboxy-L-prolyl)-oxy]-succinimide is from 0.66 to 13.4 mgm/kg body weight, preferably from 0.83 to 6.67 mgm/kg body weight, evenly divided over two to three single doses. For parenteral administration the single effective dose is from 0.083 to 1.67 mgm/kg.

Such pharmaceutical compositions may, in addition, also contain an effective dosage unit of one or more other pharmacologically active ingredients, such as hypnotics, tranquilizers, spasmolytics or anesthetics.

The following examples illustrate a few pharmaceutical dosage unit compositions comprising the tert.butyl ester of N-[(1-carboxy-L-prolyl)-oxy]-succinimide as an active ingredient and represent the best modes contemplated of putting the invention into practical use. The parts are parts by weight unless otherwise specified.

EXAMPLE 1

Coated Pills

The pill core composition is compounded from the following ingredients:

| | | |
|---|---:|---|
| Tert.butyl ester of N-[(1-carboxy-L-prolyl)-oxy]-succinimide | 90 | parts |
| Corn starch | 180 | " |
| Lactose | 110 | " |
| Magnesium stearate | 8 | " |
| Gelatin | 12 | " |
| Total | 400 | parts |

Preparation:

The ester is admixed with the corn starch and the lactose, the mixture is granulated with the aid of an aqueous 10% solution of the gelatin through a 1 mm-mesh screen, the granulate is dried at 40°C and again passed through the screen, the dry granulate is admixed with the magnesium stearate, and the resulting composition is compressed into 400 mgm-pill cores. The pill cores are subsequently coated with a thin shell consisting essentially of a mixture of sugar, talcum, titanium dioxide and gum arabic and finally polished with beeswax. Each coated pill contains 90 mgm of the ester and is an oral dosage unit composition with effective stomach juice secretion inhibiting and anti-ulcerogenic action.

EXAMPLE 2

Tablets

The tablet composition is compounded from the following ingredients:

| | | |
|---|---:|---|
| Tert.butyl ester of N-[(1-carboxy-L-prolyl)-oxo]-succinimide | 75 | parts |
| Corn starch | 240 | " |
| Lactose | 160 | " |
| Soluble starch | 20 | " |
| Magnesium stearate | 5 | " |
| Total | 500 | parts |

Preparation:

The ester is intimately admixed with the lactose and the corn starch, the mixture is granulated through a fine-mesh screen with the aid of an aqueous solution of the soluble starch, the granulate is dried and admixed with the magnesium stearate, and the resulting composition is compressed into 500 mgm-tablets in a conventional tablet making machine. Each tablet contains 75 mgm of the ester and is an oral dosage unit composition with effective stomach juice secretion inhibiting and anti-ulcerogenic action.

EXAMPLE 3

Tablets with Combination of Active Ingredients

The tablet composition is compounded from the following ingredients:

| | | |
|---|---:|---|
| Tert.butyl ester of N-[(1-carboxy-L-prolyl)-oxy]-succinimide | 60 | parts |
| 7-Chloro-1,3-dihydro-3-hydroxy-5-phenyl-2H-1,4-benzodiazepin-2-one | 10 | " |
| Corn starch | 245 | " |
| Lactose | 160 | " |
| Soluble starch | 20 | " |
| Magnesium stearate | 5 | " |
| Total | 500 | parts |

Preparation:

The ingredients are admixed and compounded in a manner analogous to that described in the preceding example, and the composition is compressed into 500 mgm-tablets. Each tablet contains 60 mgm of the ester and 10 mgm of the benzodiazepinone compound and is an oral dosage unit composition with effective stomach juice secretion inhibiting, anti-ulcerogenic and tranquilizing action.

EXAMPLE 4

Suppositories

The suppository composition is compounded from the following ingredients:

| | | |
|---|---:|---|
| Tert.butyl ester of N-[(1-carboxy-L-prolyl)-oxy]-succinimide | 120 | parts |
| Suppository base (e.g. cocoa butter) | 1680 | " |
| Total | 1800 | parts |

Preparation:

The finely powdered ester is stirred with the aid of an immersion homogenizer into the suppository base which has previously been melted and cooled to about 40°C. 1800 mgm-portions of the resulting mixture are poured at 40°C into cooled suppository molds and allowed to harden therein. Each suppository contains 120 mgm of the ester and is a rectal dosage unit composition with effective stomach juice secretion inhibiting anti-ulcerogenic action.

The amount of the tert.butyl ester of N-[(1-carboxy-L-propyl)-oxy]-succinimide in the above illustrative examples may be varied to achieve the dosage ranges set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A method for the treatment of gastric hypersecretion and ulceration of the stomach in a warm-blooded animal, which comprises perorally, parenterally or rectally administering to said animal an effective gastric secretion inhibiting or anti-ulcerogenic amount of the tert.butyl ester of N-[(1-carboxy-L-prolyl)-oxy]-succinimide.

\* \* \* \* \*